United States Patent [19]
de Molina et al.

[11] Patent Number: 5,967,268
[45] Date of Patent: Oct. 19, 1999

[54] TEMPERATURE RESPONSIVE DAMPER

[75] Inventors: Simon Anne de Molina, Merchtem; Bart Vandewal, Alken, both of Belgium

[73] Assignee: Tenneco Automotive Inc., Lake Forest, Ill.

[21] Appl. No.: 08/819,250

[22] Filed: Mar. 17, 1997

[51] Int. Cl.⁶ .................................................. F16F 9/34
[52] U.S. Cl. ...................................... 188/277; 188/266.5
[58] Field of Search ................................... 188/276, 277, 188/278, 266.5

[56] References Cited

U.S. PATENT DOCUMENTS

| | | | |
|---|---|---|---|
| 2,196,436 | 4/1940 | Briggs . | |
| 2,800,203 | 7/1957 | Beyer | 188/278 |
| 2,950,785 | 8/1960 | Patriquin . | |
| 3,107,752 | 10/1963 | McLean . | |
| 3,944,197 | 3/1976 | Dachicourt . | |
| 3,958,672 | 5/1976 | Keilholz | 188/277 |
| 4,735,401 | 4/1988 | Buma et al. . | |
| 4,785,921 | 11/1988 | Hosan et al. . | |
| 4,958,706 | 9/1990 | Richardson et al. . | |
| 5,005,678 | 4/1991 | Julien et al. | 188/378 |
| 5,106,065 | 4/1992 | Staton et al. . | |
| 5,152,379 | 10/1992 | Sackett et al. | 188/266.5 |
| 5,594,330 | 1/1997 | Jacobsen | 324/106 |
| 5,667,003 | 9/1997 | Mahdjuri-Sabet | 165/274 |

FOREIGN PATENT DOCUMENTS

| | | | |
|---|---|---|---|
| 3227903 | 2/1984 | Germany | 188/276 |
| 0086941 | 7/1980 | Japan | 188/278 |

*Primary Examiner*—Matthew C. Graham
*Attorney, Agent, or Firm*—Harness, Dickey & Pierce, PLC

[57] ABSTRACT

A shock absorber demonstrating temperature conscious damping includes an auxiliary valve for passing damping fluid between the compression side and the rebound side. The auxiliary valve opens at lower temperatures and closes at higher temperatures. The valve includes an axial channel formed partially through a piston rod that terminates in a side hole on the rebound side of the piston. Movably fitted within the channel is a sliding rod valve that is movable between an open position which allows passage of the damping fluid and a closed position which prohibits passage. The valve is tubular and includes a hole formed in its side at one end. A steel spring is positioned between the blind end of the channel and the sliding rod valve. A tubular sleeve is fitted in the channel on the compression side of the piston. Between the tubular sleeve and the rod valve is positioned a spring formed from a shape memory alloy.

17 Claims, 2 Drawing Sheets

TEMPERATURE RESPONSIVE DAMPER

BACKGROUND OF THE INVENTION

1. Field of the Invention

The present invention relates generally to shock absorbers capable of responding to changes in fluid viscosity. More particularly, the present invention relates to a shock absorber that is temperature conscious and is thus responsive to changes in operating temperatures. The shock absorber of the present invention is accordingly highly sensitive to temperature variations and compensates for changes in oil viscosity throughout the normal range of ambient temperatures through the use of a valve system that incorporates a spring produced from a shape memory alloy.

2. Description of the Relevant Art

Shock absorbers are used in connection with automobile suspension systems and other vehicle suspension systems to absorb unwanted vibrations which occur during locomotion. To absorb this unwanted vibration, shock absorbers are generally connected between the body and the suspension of the automobile.

The most common type of shock absorber in automobiles is the dashpot type in which a piston is located within the shock absorber and is connected to the vehicle body through a piston rod. Because the piston is available to limit the flow of damping fluid within the working chamber of the shock absorber when the shock absorber is compressed or extended, the shock vibration which would otherwise be transmitted from the suspension of the automobile to the body is absorbed by the shock absorber.

A conventional shock absorber comprises a pressure tube with a piston therein and a reserve tube surrounding the pressure tube. A piston rod connected to the piston projects from one end of the pressure tube. At the other end of the pressure tube is a valve communicating with the reserve tube. Damping is controlled by orifices in the piston which regulate passage of fluid from one side of the piston to the other.

The use of a viscous oil as the damping fluid causes the damping and rebound times of known shock absorbers to change at different temperatures. The oil is more viscous at cooler temperatures than at warmer temperatures. Accordingly, the fluid flow through the various orifices in the piston is slower at cold temperatures than at warm temperatures, thus resulting in less responsive damping and rebounding characteristics. This situation is problematic as heat is produced from the energy of the moving mass of the vehicle. While much of this heat is dissipated by radiation and conduction, the damping fluid itself absorbs some of it, thus becoming less viscous. Seasonal ambient air temperatures also have an impact on damping fluid viscosity.

Various attempts have been made over the years to eliminate or minimize the problem of temperature-influenced changes in the characteristics of the shock absorber. One approach is to allow for mechanical adjusting of the shock absorber, such as that embodied in U.S. Pat. No. 4,958,706, issued to Richardson et al. on Sep. 25, 1990, for ADJUSTABLE SHOCK ABSORBERS. The drawback with this mechanically adjustable approach is that the operator must physically make the necessary adjustments to compensate for the change in fluid temperature.

Other approaches included "automatic" responses built into the shock absorbers by relatively complex valve systems incorporated in the piston member itself. Examples of these approaches include U.S. Pat. No. 2,111,192, issued on Mar. 15, 1938 to Padgett for SHOCK ABSORBING MEANS, U.S. Pat. No. 3,107,752, issued on Oct. 22, 1963, to McLean for TEMPERATURE COMPENSATED VISCOUS DAMPER, and U.S. Pat. No. 4,785,921, issued on Nov. 22, 1988, to Hosan et al. for TEMPERATURE-COMPENSATING HYDRAULIC POSITIONER. While providing some level of "automation" thus eliminating dependence on the operator to make the correction, these designs are in generally overly-complex and do not provide direct temperature compensation.

In an effort to provide a mechanism which more directly responds to changes in temperature, U.S. Pat. No. 5,106,065, issued on Apr. 21, 1992, to Staton et al. for SELF-BLOCKING GAS SPRING WITH TEMPERATURE-RESPONSIVE BYPASS VALVE, provides a self-blocking gas spring having a temperature responsive bypass valve. A bimetallic disk is used to open and close a port depending on the temperature of the disk itself. If the temperature is low, the disk assumes a flat shape, closing the port and preventing the damping fluid from flowing through the bypass valve. If the temperature is high, the disk is warmed and assumes a curved shape which opens the port and allows the damping fluid to flow through the bypass valve. While having improved temperature-responsive characteristics, this system is relatively complex and requires extensive modification of known shock absorbers.

Accordingly, a shock absorber that is reliably and fully temperature responsive while utilizing a minimum number of components is wanting.

SUMMARY OF THE INVENTION

Accordingly, it is a primary object of the present invention to provide a shock absorber in which changes in temperature do not affect compression or rebound characteristics.

Another object of the present invention is to provide a shock absorber that incorporates an auxiliary valve that opens as oil viscosity increases and closes as oil viscosity decreases.

An additional object of the present invention is to provide such a shock absorber in which the auxiliary valve is positionable between being fully opened and being fully closed and may be opened to any degree therebetween.

A further object of the present invention is to provide a valve having such a valve that utilizes a spring composed of a shape memory alloy.

A shock absorber according to the present invention comprises compression side to rebound side valves. In addition to these valves, an auxiliary valve is provided and includes an axial channel formed partially through the piston rod that terminates approximately in a side hole on the rebound side of the piston. Movably fitted within the channel is a sliding rod valve that is movable between an open position which allows passage of the damping fluid and a closed position which prohibits passage. The valve is tubular and includes a hole formed in its side at one end. A steel spring is positioned between the blind end of the channel and the sliding rod valve. A tubular sleeve is fitted in the channel on the compression side of the piston. Between the tubular sleeve and the rod valve is positioned a spring formed from a shape memory alloy.

At cooler temperatures the length of the shape memory alloy spring is contracted and the steel spring acts against the sliding rod valve to move the hole formed in its lower side in general alignment with the hole formed in the piston rod on the rebound side. As temperatures rise the length of the shape memory alloy spring increases, thus overcoming the resistive forces of the steel spring and pushing the slidable rod valve gradually toward the blind end of the channel so that the hole of the rod valve is gradually moved out of alignment with the hole in the side of the rod.

Thus the present invention provides a temperature-sensitive auxiliary flow path which allows damping fluid to bypass to varying degrees the normal rebound side to compression side flow of damping fluid as the fluid's viscosity changes.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which.

DETAILED DESCRIPTION OF THE PREFERRED EMBODIMENT

The drawings disclose the preferred embodiment of the present invention. While the configurations according to the illustrated embodiment are preferred, it is envisioned that alternate configurations of the present invention may be adopted without deviating from the invention as portrayed. The preferred embodiment is discussed hereafter.

Figure 1:
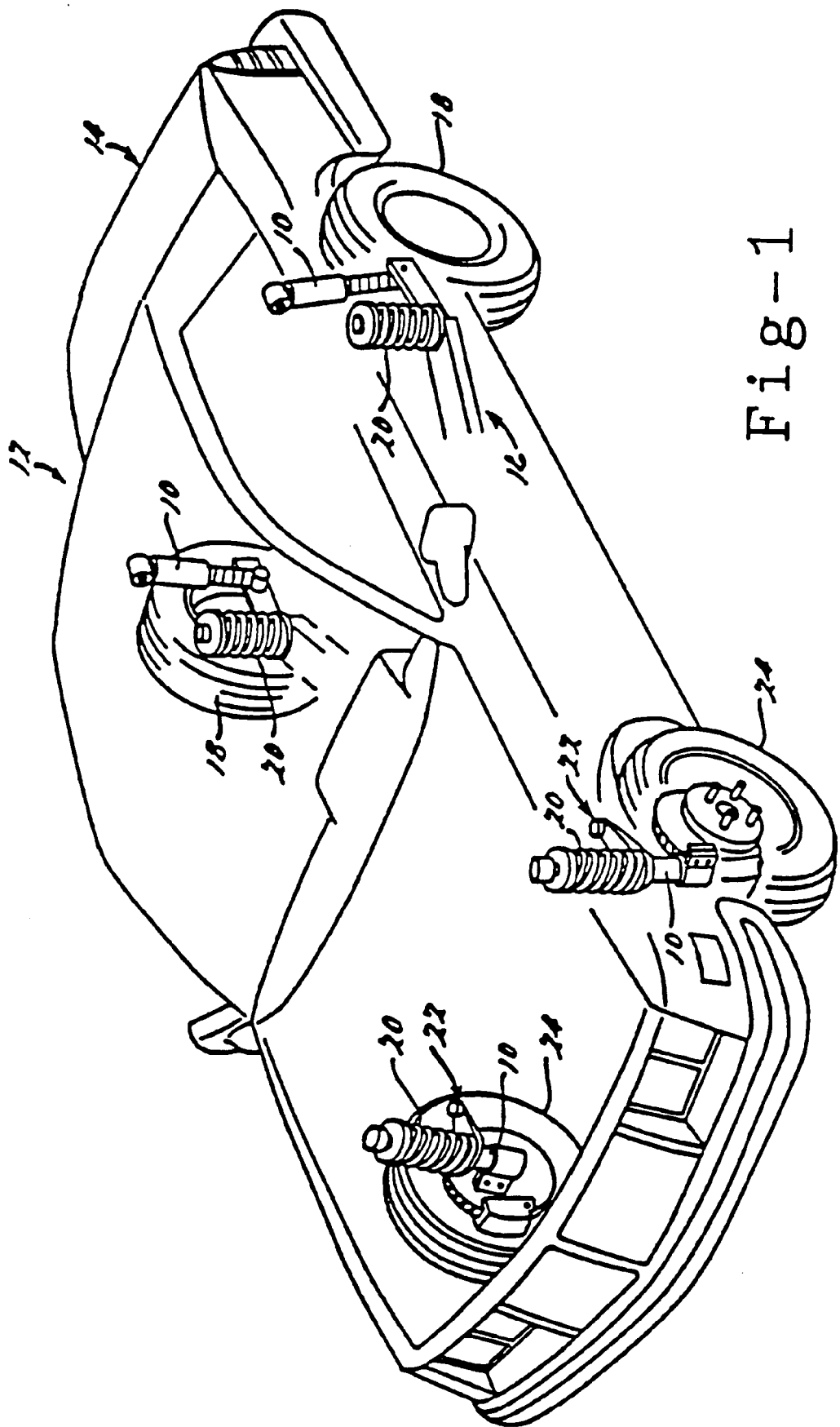
FIG. 1 is a schematic representation of the shock absorbers, according to the present invention in operative association with a typical automobile.

Referring to FIG. 1, a plurality of four shock absorbers 10 according to a preferred embodiment of the present invention are shown. The shock absorbers 10 are depicted in operative association with a diagrammatic representation of a conventional automobile 12 having a vehicle body 14. The automobile 12 includes a rear suspension system 16 having a transversely extending rear axle assembly (not shown) adapted to operatively support the vehicle's rear wheels 18. The rear axle assembly is operatively connected to the automobile 12 by a pair of shock absorbers 10 and a pair of helical coil springs 20. Similarly, the automobile 12 has a front suspension system 22 including a transversely extending front axle assembly (not shown) to operatively support the vehicle's front wheels 24. The front axle assembly is operatively connected to the vehicle body 14 by means of a second pair of shock absorbers 10 and by another pair of helical coil springs 20. The shock absorbers 10 serve to damp the relative movement of the unsprung portion (i.e., the front and rear suspension systems 22 and 16) and the sprung portion (i.e., the body 14) of the automobile 12. While the automobile 12 has been depicted as a passenger car, the shock absorber 10 may be used with other types of vehicles or in other types of vibration damping applications. Further, the term "shock absorber" as used herein will refer to shock absorbers in the general sense of the phrase and will include MacPherson struts.

Figure 2:
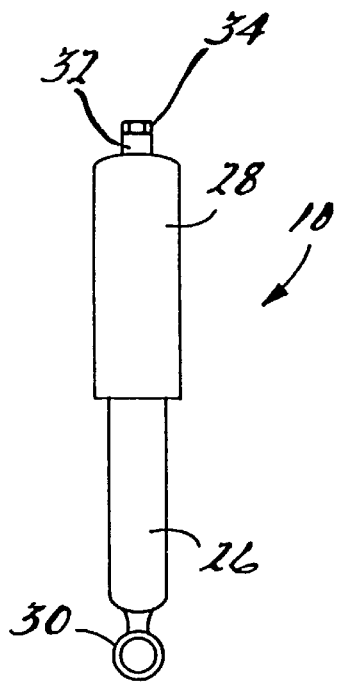
FIG. 2 is plan view of a shock absorber according to the present invention.

With particular reference now to FIG. 2, the shock absorber 10 according to the present invention is shown. The shock absorber 10 comprises a first tubular end 26 and a second tubular end 28, the ends 26 and 28 generally defining tubular assemblies. A suitable end fitting 30 is secured to the lower end of the first end 26 for operatively securing the shock absorber 10 to the axle assembly of the automobile 12 in a conventional manner. A piston rod 32 includes a threaded end 34 that extends through the second end 28 and is attached to the vehicle body 14 also in a conventional manner.

Figure 3:
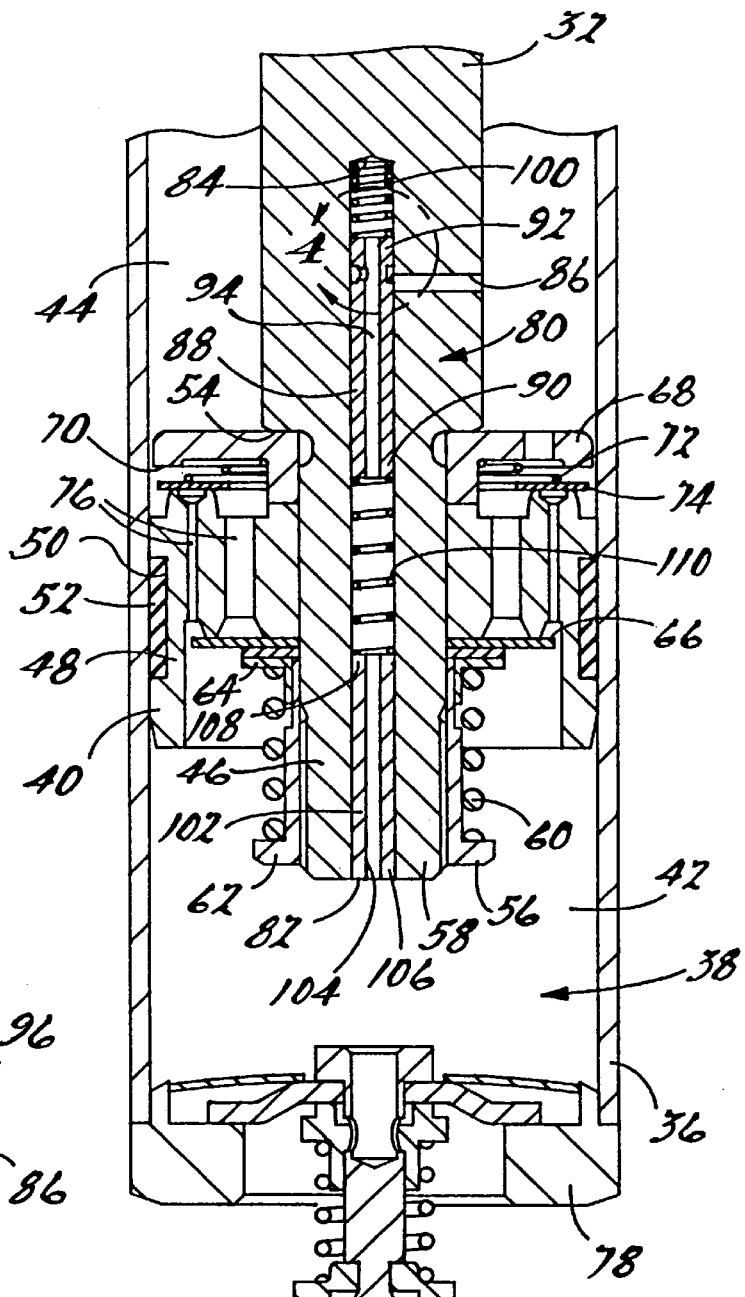
FIG. 3 is a sectional view of the piston-housing end of the shock absorber of FIG. 2.

With respect to FIG. 3, a sectional view of the piston-housing end of the shock absorber 10 is illustrated. The shock absorber 10 comprises an elongated pressure tube cylinder 36 defining a damping fluid containing working chamber 38. The elongated pressure tube cylinder 36 is generally housed within the second tubular end 28 in a known manner.

A slidably movable piston 40 divides the chamber 38 into a compression side 42 and a rebound side 44. The reciprocal piston 40 is secured to one end of an axially extending piston post 46 which is in turn secured to the axially extending piston rod 32 which passes through the tubular second end 28.

The piston 40 comprises a piston housing 48 having a peripheral channel 50 defined on the annular exterior of the piston housing 48. A seal 52 is fitted within the channel 50 to form a fluid-tight seal between the inner peripheral wall of the cylinder 36 and the piston 40. The seal 52 permits movement of the piston 40 with respect to the cylinder 36 without generating undue frictional forces.

Movement of the piston 40 in a first direction is limited by a radially extending step portion 54 of the piston post 46. Movement of the piston 40 in a second direction is limited by a threaded nut 56 or similar type of fastening element which is threadably received upon the lower end 58 of the piston post 46. A helical coil spring 60 is arranged concentrically of the nut 56 and is supported at one end thereof by a radially outwardly extending flange 62 on the upper end of the nut 56. The opposite end of the spring 60 bears against a spring retainer 64 which in turn acts against a valve disk 66 and the bottom side of the piston housing 48 to thereby resiliently urge the piston upward.

The upperside of the piston 40 includes a radial support plate 68 and an adjacent radial groove 70. Within the groove 70 is fitted an intake spring 72 that resiliently presses against an intake valve disk 74. The piston 40 including the valve disk 74 provide a means for controlling the flow of damping fluid between the first and second sides 42 and 44 of the working chamber 38 through a plurality of orifices 76 in the piston housing 48.

It is to be understood that the piston 40 is described in general terms as the present invention may be used with a wide variety of piston designs. One such piston is disclosed in U.S. Pat. No. 4,113,072, which is hereby incorporated by reference.

The shock absorber 10 further comprises a base valve 78 located within the lower end of the pressure tube cylinder 36 which is used to permit the flow of damping fluid into and out of the working chamber 38 from and to an annular fluid reservoir (not shown) during rebound. The annular fluid reservoir is defined as the space between the outer periphery of the cylinder 36 and the inner periphery of a reservoir tube or cylinder which is generally formed by the end 26 which is arranged preferably concentrically around the exterior of the pressure cylinder 36. The base valve 78 may be designed so that damping fluid is unable to flow through the base valve 78 during compression. If the base valve 78 is designed in this manner, the damping forces generated during compression will be substantially fully controlled by the amount of damping fluid flowing through the piston 40. Accordingly, the range of damping which may be generated by the shock absorber 10 may be somewhat larger than otherwise possible if the shock absorber 10 is part of an adjustable damping suspension system.

The shock absorber 10 includes an auxiliary valve, generally illustrated as 80. The valve 80 includes a channel 82 partially formed along the long axis of the piston rod 32. The channel 82 is open at the lower end 58 of the piston post 46 and terminates at a blind end 84. A side hole 86 is formed substantially perpendicularly to the channel 82 and is in fluid communication therewith. Without the temperature-responsive valve elements described hereafter, damping fluid would be allowed to pass freely back and forth between the compression side 42 and the rebound side 44 of the piston 40.

The temperature-responsive valve elements positioned within the channel 82 include a sliding rod valve 88 having a lower end 90 and an upper end 92. The valve 88 is substantially tubular and includes a passage 94 longitudinally formed between the lower end 90 and the upper end 92.

Figure 4:
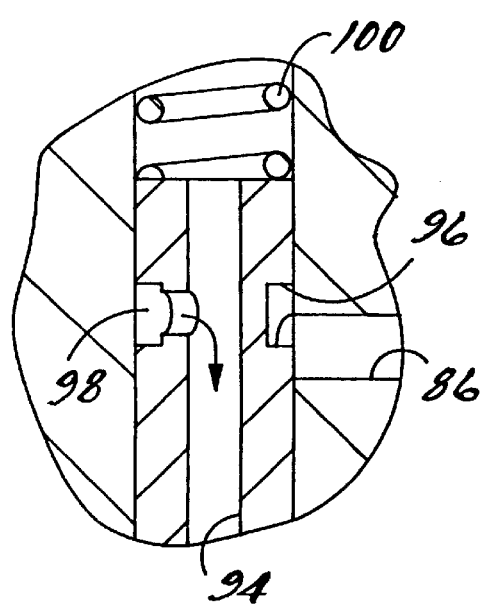
FIG. 4 is a detailed view of the base of the sliding rod valve in position within the channel formed in the piston rod and the associated steel spring.

At the upper end 92 is formed a variable bleed groove 96 that is formed on the outer surface of the valve 88. This is shown in FIG. 4 which is a detailed view of the upper end 92 and is an enlarged portion of FIG. 3. A port 98 is formed between the groove 96 and the passage 94. The illustrated design minimizes turbulence and maximizes the smooth flow of damping fluid between the compression side 42 and the rebound side 44 of the piston 40.

Between the upper end 92 of the valve 88 and the blind end 84 of the channel 82 is positioned a steel spring 100. The compressive characteristics of the steel spring 100 are constant regardless of temperature. The spring 100 continuously urges the valve 88 away from the blind end 84 of the channel 82.

A fit tube or sleeve 102 is press fitted into the lower end 58 of the post 46. The sleeve 102 has a fluid channel 104 axially defined therethrough. The sleeve 102 has a lower end 106 that is substantially flush with the radial surface of the lower end 58 of the post 46. The sleeve 102 also has an upper end 108.

Positioned between the lower end 90 of the sliding rod valve 88 and the upper end 108 of the sleeve 102 is a temperature sensitive spring 110 formed from a shape memory alloy. These alloys, composed typically of nickel and titanium (called nitinal), demonstrate thermoelastic properties which, after deformation, allows the material to return to its original shape after being heated. More particularly, an object is deformed to a different shape after being cooled from a first temperature $T_1$ to a second temperature $T_2$. When the object is heated from the second temperature $T_2$ back to the first temperature $T_1$, the original shape is acquired.

The transformation between shapes is based on martensitic phase transformation in which the object undergoes a reversible change in crystal structure. The transformation acquired its name from the growth of new martensite plates that form as temperature is lowered. These same plates disappear as the temperature is elevated. The original or "remembered" shape of the object is that achieved at the first temperature $T_1$. At the second temperature $T_2$, the martensite phase is achieved and shape of the object is changed.

The original shape of the temperature-sensitive spring 110 is its expanded, elongated shape, while the transformed configuration is contracted and foreshortened. The shape illustrated in FIG. 3 represents a configuration between these two extremes.

In operation, the operating temperature of the damping fluid of the shock absorber 10 is typically relatively cool. This is particularly true in the wintertime in temperate climates. At this time the temperature-sensitive spring 110 is in its transformed or foreshortened state, and, by the resilient action of the steel spring 100, the sliding rod valve 88 is moved to its "open" position in which the groove 96 is substantially aligned with the side hole 86. In this position, a quantity of damping fluid (not shown) is able to freely move between the compression side 42 and the rebound side 44 of the piston 40. It is to be understood that throughout the operation of the shock absorber 10 the damping fluid is able to be selectively passed between the compression side 42 and the rebound side 44 of the piston 40 in a conventional manner. The valve 80 is provided only to compensate for changes in the viscosity, not to replace conventional valves.

As the shock absorber 10 is used, the energy of the vehicle in motion is converted to heat as the fluid is forced through the valves conventionally associated with the piston 40. This heat gradually warms the components of shock absorber 10 and the damping fluid by conduction. The temperature-sensitive spring 110 is also heated, and gradually returns to its original, fully extended shape.

Because the heating of the components of the shock absorber 10 and its fluid is gradual, the temperature-sensitive spring 110 gradually becomes elongated due to its thermoelastic, shape memory properties. The temperature-sensitive spring 110 pushes against the sliding rod valve 88, thus gradually displacing the groove 96 from alignment with the side hole 86. As this occurs, the damping fluid bypassing the conventional piston valves by flowing through the auxiliary valve 80 is gradually decreased, until the temperature-sensitive spring 110 reaches its maximum length. At this point the groove 96 is completely out of alignment with the side hole 86, and no fluid is allowed to pass through the auxiliary valve 80.

Of course, while the invention has been described above as having the spring 110 between the sleeve 102 and the sliding rod valve 88 as being responsive to changes in temperature and the steel spring 100 as being nonresponsive, the materials of these springs could be reversed such that the spring 110 is composed of a material that is not responsive to changes in temperature while the spring 100 is composed of a material that is so responsive. In addition, the rate of movement of the sliding rod valve 88 could be finely tuned by either making the springs 100 and 110 progressive or not and by changing the proportions of the metals making up the alloy of the shape memory alloy. Compression regulation could also be achieved by slightly increasing the stiffness of the sliding intake spring 72. This would effect a differential pressure over the piston that allows the auxiliary valve 80 to function.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A shock absorber comprising:
   a pressure tube symmetrically disposed about an axis, said pressure tube forming a working chamber having upper and lower portions;
   a piston slidably disposed between and separating said upper and lower portions of said working chamber, said piston allowing restricted flow of hydraulic fluid between said upper and lower portions;

a piston slidably disposed between and separating said upper and lower portions of said working chamber, said piston allowing restricted flow of hydraulic fluid between said upper and lower portions of said working chamber;

an elongated piston rod having first and second ends, said first end being attached to said piston, said second end of said elongated piston rod extending along the axis of said pressure tube through said upper portion of said working chamber and out one end of said pressure tube, said piston rod defining a rod passage extending between said upper and lower portions of said working chamber, said rod passage including a first radial bore;

a temperature-sensitive valve assembly for controlling flow of fluid through said rod passage, said valve assembly comprising a sliding valve sleeve disposed within said passage, said sliding valve sleeve defining a sleeve passage extending through said sliding valve sleeve, said sleeve passage including a second radial bore, said valve assembly further including a spring disposed within said passage such that said flow of fluid between said upper and lower portions of said working chamber flows through said spring in direct heat transfer relation to said spring, said spring moving said valve sleeve between a first position where said first and second bores are aligned to allow said flow of fluid and a second position where said first and second bores are not aligned to prohibit said flow of fluid.

2. The shock absorber of claim 1, wherein said spring is composed of a shape memory alloy.

3. The shock absorber of claim 1, wherein said passage includes a blind bore, said blind bore having a first end for fluid communication with said lower portion of said working chamber and a blind end, said first radial bore being in fluid communication with said upper portion of said working chamber, and said sliding valve sleeve being slidably positioned within said blind bore.

4. The shock absorber of claim 3, wherein said spring is temperature sensitive for moving said sliding valve sleeve between said first and second positions.

5. The shock absorber of claim 4, wherein said spring is composed of a shape memory alloy.

6. The shock absorber of claim 5, wherein said valve assembly further includes a stationary sleeve fitted within said blind bore, said spring being positioned between said stationary sleeve and said sliding valve sleeve.

7. The shock absorber of claim 5, further comprising a biasing member positioned between said blind end and said sliding valve sleeve.

8. The shock absorber of claim 7, wherein said biasing member is a coil spring.

9. A shock absorber comprising:

a pressure tube forming a working chamber having upper and lower portions;

a piston assembly slidably disposed between and separating said upper and lower portions of said working chamber, said piston allowing restricted flow of hydraulic fluid between said upper and lower portions of said working chamber, said piston assembly defining a plurality of passages extending between said upper and lower portions of said working chambers;

a temperature-sensitive valve assembly disposed within one of said plurality of passages, said one of said plurality of passages defining a first radial bore, said valve assembly including a valve and a temperature-sensitive valve actuator, said valve actuator being disposed within said one passage such that fluid flow through said passage flows through said valve actuator in direct heat transfer relation to said valve actuator, said valve defining an aperture having a second radial bore for allowing flow of fluid between said upper and lower portions of said working chamber, said valve being movable by said actuator between a first position that aligns said first and second radial bores to allow damping fluid to pass between said upper and lower portions and a second position that misaligns said first and second radial bores to restrict such passage.

10. The shock absorber of claim 9, wherein said temperature-sensitive valve actuator is composed of a shape memory alloy.

11. The shock absorber of claim 10, wherein said temperature-sensitive valve is a spring.

12. The shock absorber of claim 9, wherein said valve is slidably disposed within said one passage.

13. The shock absorber of claim 12, wherein said valve comprises a tubular member having an interior bore and having a groove peripherally formed thereon, said groove being in fluid communication with said interior bore.

14. The shock absorber of claim 13, wherein said temperature-sensitive valve actuator comprises a spring, said spring being disposed adjacent to said valve.

15. The shock absorber of claim 14, wherein said one passage includes a blind end and wherein said valve assembly further includes a return spring positioned between said blind end and said valve.

16. The shock absorber of claim 15, wherein said valve assembly further includes a sleeve fitted into said one passage for holding said valve, said temperature-sensitive valve actuator, and said return spring in said one passage.

17. A unit connected between two bodies for damping movement between the two bodies, said unit including:

an upper chamber and a lower chamber;

a temperature-sensitive valve assembly positioned within a passage extending between said upper and lower chamber, said passage defining a first radial bone, said valve assembly including a valve and a temperature-sensitive valve actuator, said valve actuator being disposed within said passage such that fluid flow through said passage flows through said valve actuator in direct heat transfer relation to said valve actuator, said valve defining an aperture having a second radial bore for allowing flow of fluid between said upper and lower chambers, said valve being movable by said valve actuator between a first position that aligns said first and second radial bores to allow damping fluid to pass between said upper and lower chambers and a second position that misaligns said first and second radial bores to restrict such passage.

* * * * *